April 24, 1951  J. W. COLTMAN  2,550,107
RADIATION DETECTOR
Filed Oct. 7, 1947  2 Sheets-Sheet 1
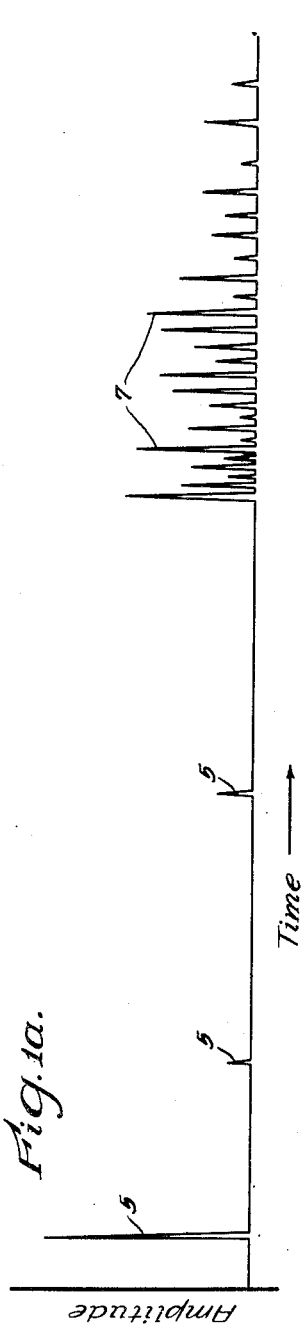
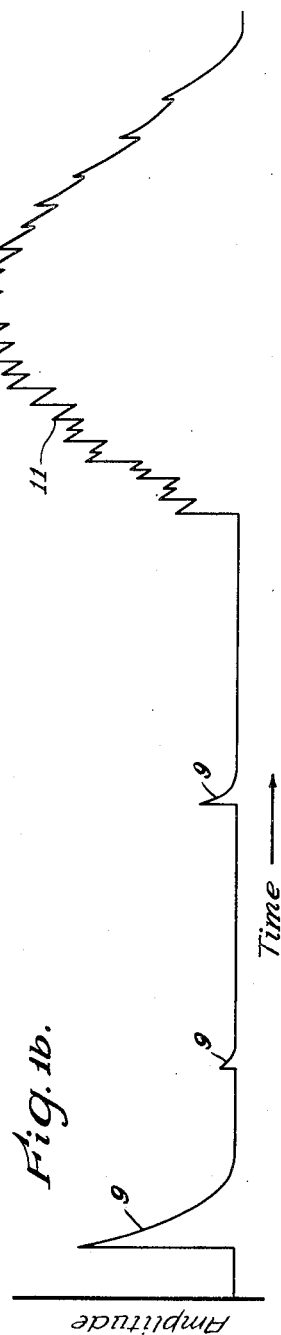
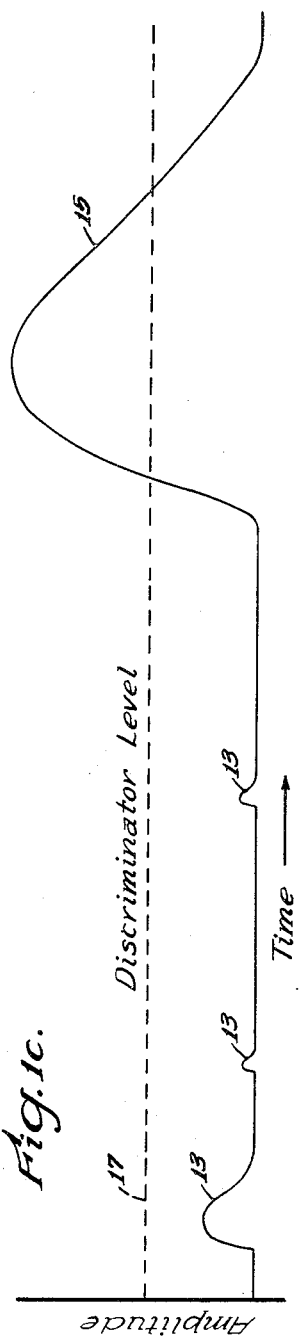
WITNESSES:
Robert A. Baird
Wm. C. Groome
INVENTOR
John W. Coltman.
BY
Hymen Diamond.
ATTORNEY April 24, 1951
J. W. COLTMAN
RADIATION-DETECTOR
2,550,107
Filed Oct. 7, 1947
2 Sheets—Sheet 2
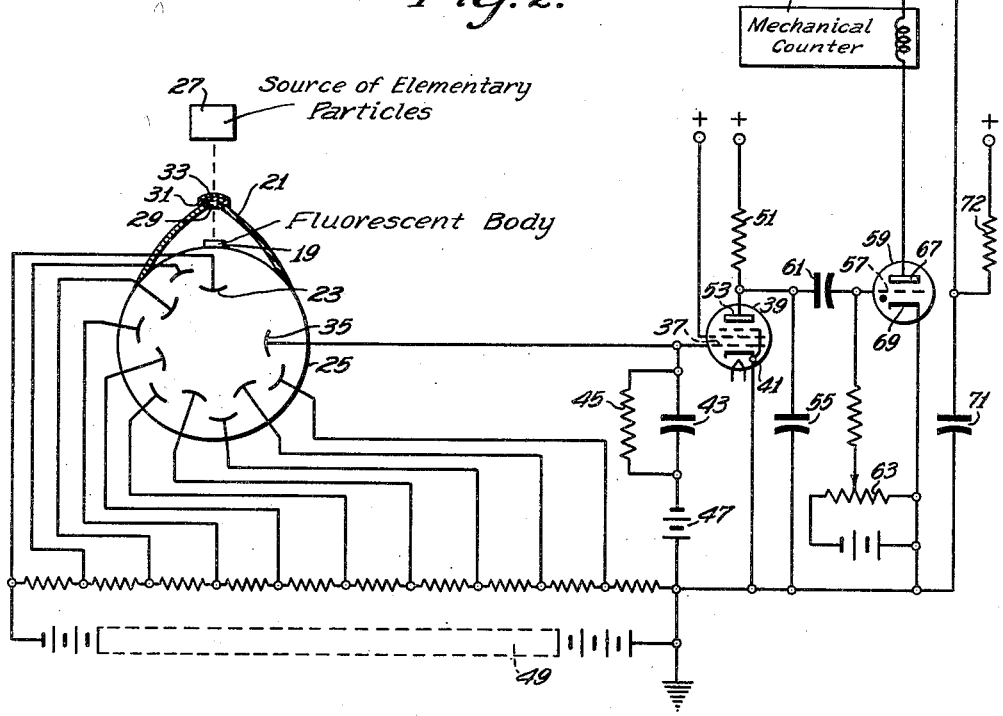
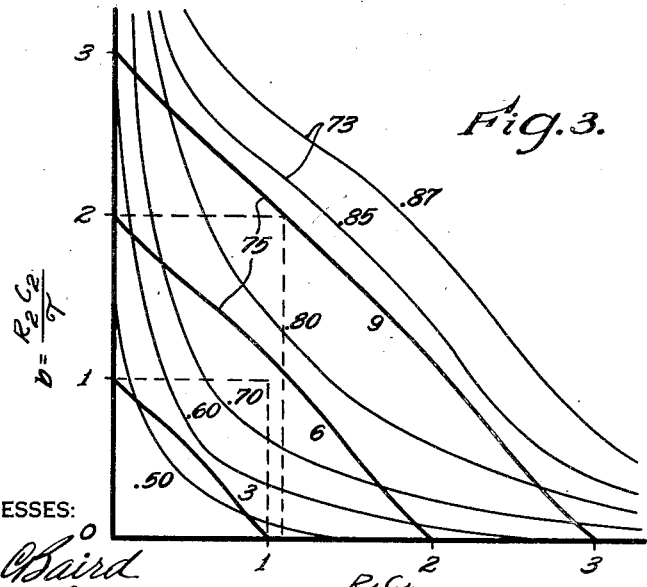
WITNESSES:
Robert C. Baird
Mw. C. Groome
INVENTOR
John W. Coltman.
BY
Hyman Diamond
ATTORNEY Patented Apr. 24, 1951

2,550,107

UNITED STATES PATENT OFFICE 2,550,107

RADIATION DETECTOR

John W. Coltman, Pittsburgh, Pa., assignor to Westinghouse Electric Corporation, East Pittsburgh, Pa., a corporation of Pennsylvania Application October 7, 1947, Serial No. 778,337

26 Claims. (Cl. 250—71)

My invention relates to the detection of elementary particles and it has particular relation to photo-sensitive apparatus for the detection of such particles. This application is an outgrowth and a continuation-in-part of my work on application, Serial No. 752,942, filed June 6, 1947, to Fitz-Hugh B. Marshall and me and assigned to Westinghouse Electric Corporation.

In our application, Marshall and I disclose a system for detecting and counting elementary particles. We define elementary particles as atomic and nuclear particles of all types, masses as well as quanta. Within the scope of this expression we include protons, neutrons, electrons, mesons, cosmic rays, alpha rays, beta rays and gamma rays. The expression "elementary particles" has the same meaning in this application.

In accordance with our above-entitled application, we provide apparatus including a fluorescent body on which the elementary particles to be detected impinge. The light quanta which this body emits when the elementary particles are incident are collected and impressed on a photomultiplier. The output of the photomultiplier is amplified and the resultant pulses are detected or counted.

In investigating the operation of the apparatus disclosed in our above-entitled application, I have found that it is, on the whole, highly satisfactory. However, there are situations which demand higher sensitivity and higher accuracy than this apparatus affords. In carrying out the counting operations in accordance with our above-entitled application, the discharges produced in the photomultiplier by light quanta arising from elementary particles must be distinguished from the dark current or noise (thermal) discharges of the photomultiplier. In accordance with our above-entitled application, this distinction is effected by an electronic discriminator which is so set as to suppress pulses whose amplitude falls below the magnitude of most of the dark current pulses and to transmit pulses whose amplitude is greater than this magnitude. I have found that this discriminator does not operate infallibly. Numerous dark current pulses have an amplitude exceeding in magnitude many of the pulses produced by light quanta arising from elementary particles. Elementary particles which impart a low energy to the fluorescent screen, such as beta rays, produce relatively few light quanta and the latter produce photomultiplier current pulses of low amplitude which fall below the magnitude of the dark current pulses suppressed by the discriminator. The apparatus disclosed in our above-entitled application thus frequently indicates the incidence of elementary particles on the occurrence of dark current discharges and fails to indicate the incidence of certain elementary particles.

It is, accordingly, an object of my invention to provide a method and apparatus for accurately discriminating between the incidence of elementary particles and thermal or other stray disturbances.

Another object of my invention is to provide highly sensitive apparatus for detecting elementary particles.

A further object of my invention is to provide highly sensitive apparatus for detecting elementary particles which shall, nevertheless, operate to reject signals arising from thermal or other stray disturbances.

Still another object of my invention is to provide elementary particle detecting, indicating or counting apparatus which shall have a high signal plus noise-to-noise ratio.

An ancillary object of my invention is to provide a photomultiplier system which shall accurately distinguish between impressed signals and thermal or other stray discharges.

Another ancilliary object of my invention is to provide a photomultiplier system which shall distinguish between impressed light quanta and dark current discharges of the photomultiplier.

Still another object of my invention is to provide a photomultiplier circuit which shall have a high signal plus noise-to-noise ratio.

A still further object of my invention is to provide a signal pick-up system which shall have a high signal plus noise-to-noise ratio.

My invention arises from the realization that the signal current discharges produced in a photomultiplier by light quanta derived from a fluorescent body occur in groups or trains while the dark current discharges occur as individual disturbances. When an elementary particle impinges on a fluorescent body, of the type used in the practice of my invention, the body emits a series or train of light flashes, manifestations of corresponding individual quanta. The durations between these flashes increases progressively as a function of the time following the incidence of the elementary particle. The emission of quanta from the fluorescent body when influenced by the elementary particles thus decays as a function of the time following the incidence. I shall call the time interval, following incidence, during which the intensity of the emitted radiation decays to approximately ⅓ (one divided by the exponential $e$) of its initial value the decay interval or decay constant of the phosphor. The decay interval varies with the character of the fluorescent body but is ordinarily of the order of 10 to 50 microseconds. For a Patterson "D" phosphor, the decay interval is of the order of 17 microseconds. The average interval between dark current pulses is, over a wide range of temperatures, dependent on the properties of the photomultiplier and is ordinarily of the order of 50 microseconds. At liquid air temperatures and below these temperatures it is substantially greater.

In accordance with my invention, I distinguish between the discharges arising from elementary particles (which I shall call signal discharges) and the dark current discharges by integrating the potential pulses produced at the output of the photomultiplier and comparing the lower harmonic content of the wave form of the integrated signal pulses and the single dark current pulses.

In its more specific aspects, my invention is limited to the cooperation of a photomultiplier and a fluorescent body. The concept involved in my invention in its broader aspects may be applied to any situation in which any impressed parameter produces a train of signals. Such a train of signals can be distinguished from the individual thermal or other stray disturbances, ordinarily called noise, which occur at ordinary temperatures.

The novel features that I consider characteristic of my invention are set forth with particularity in the appended claims. My invention itself, however, both as to its organization and its method of operation, together with further objects and advantages thereof will best be understood by reference to the following description and to the drawings; in which Figures 1a, 1b and 1c are graphs illustrating the basic features of my invention;

Fig. 2 is a diagrammatic view showing a preferred embodiment of my invention; and, Fig. 3 is another graph showing how the parameters of the circuit shown in Fig. 2 are selected in the practice of my invention.

In Fig. 1a the amplitude of the discharge occurring at the anode of a photomultiplier operating as disclosed in our above-entitled application is plotted as a function of time. Amplitude which may be measured in terms of potential difference at the electrodes of the photomultiplier is plotted vertically; time is plotted horizontally. The three individual peaks 5 on the left represent dark current discharges. These discharges occur at isolated disturbances due to the thermal emission of a single electron at the cathode of the photomultiplier.

Because the secondary emission process of amplification in the photomultiplier is statistical in nature, the pulses arriving at the anode are of different amplitudes; the various amplitudes falling along a distribution curve which may be derived mathematically. The peaks 7 on the right represent the discharges produced when the quanta derived from a phosphor under the influence of an elementary particle impinge on the cathode of the photomultiplier. These peaks (which I shall call signal peaks) corresponding to the signal discharges which are also due to the emission of single electrons ejected from the cathode, in this case by light quanta, and are similar in nature to dark current peaks. The signal discharges, however, do not occur as isolated disturbances, like the dark current discharges, but in trains or groups. The interval between the individual signal discharges gradually increases as a function of the time following the incidence of the elementary particles as the phosphor decays. Accordingly, the interval between the last and the next to the last peaks 7 on the extreme right is substantially greater than the interval between the first and second peaks 7 at the beginning of the train.

In accordance with my invention, the charges represented by peaks 5 and 7 in Fig. 1a are collected and the resultant collected charge is permitted to leak off at a predetermined low rate. The potentials thus produced are represented by the graphs 9 and 11, respectively, in Fig. 1b. Amplitude is plotted vertically and time horizontally; the points along the time axis represent the same instants as the corresponding points along the time axis of Fig. 1a vertically above them. The first, second, and third peaks 9 on the left correspond to dark current discharges collected. The jagged loop 11 on the right corresponds to train of signal discharges.

The loop 11 is substantially higher than the peaks 9 and the signal discharges may be distinguished by comparing these heights. The peaks 9 on the left of Fig. 1b also have a relatively sharp waveform while the envelope of the jagged loop 11 is relatively smooth. The peaks on the left may be further distinguished from the loop on the right by comparing the waveforms of their corresponding functions. This object may be conveniently accomplished by transmitting signals corresponding to the peaks through a low-pass filter. The result of such filtering action is illustrated in Fig. 1c where amplitude of the filtered signal is plotted vertically and time is plotted horizontally. Since the high frequencies are absorbed in the filter, the curves corresponding to the sharp dark current peaks of Fig. 1b are now relatively short, rounded loops 13 and the curve corresponding to the jagged loop 11 of Fig. 1b is now a relatively high loop 15. A suitable discriminator may be set at an amplitude corresponding to the broken horizontal line 17 of Fig. 1c so that the loops 15 of high amplitude corresponding to the signal discharges are distinguished from the low amplitude loops 13 corresponding to the dark current.

The apparatus shown in Fig. 2 comprises a fluorescent body 19 which may have the compositions specified for such bodies in our above-entitled application, in an application Serial No. 755,636, filed June 19, 1947, by Kuan Han-Sun, now Patent No. 2,534,932 and assigned to Westinghouse Electric Corporation, or any other composition known in the art. The fluorescent body 19 is disposed within a hood-like reflector 21 adjacent to the cathode 23 of a photomultiplier 25. Preferably the reflector 21 rests against the envelope of the photomultiplier 25. The reflector and photomultiplier are preferably disposed within a light-tight container (not shown) which has an opening therein to transmit elementary particles. The reflector 21 is of the curved type and may be cylindrical, spherical, or parabolic. It may be formed from sheet metal, for example, sheet aluminum, or may be of silvered glass. The disposition of the fluorescent body 19 and the photomultipler are such that the fluorescent body and the cathode 23 are approximately at conjugate foci of the reflector.

Elementary particles from a source of any general type represented symbolically by a block 27 are projected on the fluorescent body 19. If only neutrons are to be detected, the reflector may be entirely of solid sheet metal since neutrons are capable of penetrating the aluminum or other metal of which such a reflector is composed. In the preferred practice of my invention, other elementary particles than neutrons are to be detected. An opening 29 is accordingly provided at the apex of the reflector through which elementary particles pass. Precautions should be taken to prevent light from passing through this opening and impinging on the cathode 23 of the photomultiplier. For this reason, the opening is covered by a sheet 31 of a material such as cellulose nitrate, one of the surfaces of which has a thin deposit 33 of aluminum thereto. The aluminum covered cellulose nitrate is impervious to light but permits elementary particles of all types to pass through it. The sheet of cellulose nitrate and its aluminum coating should be very thin, preferably less than $10^{-4}$ centimeters in thickness.

When an elementary particle impinges on the fluorescent body 19, the latter emits a train of light quanta during its characteristic decay interval. The light quanta impinge on the cathode of the photomultiplier and produce a series of discharges between the various electrodes of the photomultiplier and a potential appears across the load circuits 43 and 45 connected to the anode 35 of the photomultiplier.

The anode 35 is connected to the grid 37 of a thermionic tube 39, such as a 6SJ7. The junction of the grid 37 and anode 35 are connected to the cathode 41 of the tube through a network including a capacitor 43 and a resistor 45 and through a biasing potential 47. The cathode 41 and the source 49 from which the photomultiplier is supplied are at a common ground. The capacitor 43 and resistor 45 should be so selected that their time constant (the product of the capacity and the resistance) has a predetermined magnitude dependent on the relationship between the decay interval of the fluorescent body 19 and the average interval between dark current discharges. In the preferred practice of my invention, the time constant of the network is of the order of the decay interval of the fluorescent body. However, in the practice of certain aspects of my invention, the time constant of the network may be substantially greater than the decay interval of the fluorescent body and may approach or exceed the average interval between dark current discharges. The time constant may also be less than the decay interval. Where the fluorescent body is made up of Patterson "D" phosphor and has a decay constant of the order of 17 microseconds, I have found that a satisfactory network may be made up of a capacitor 43 having a capacity of the order of 20 micromicrofarads and a resistor of .9 megohm. In Fig. 2 the capacitor 43 is shown as a lumped component. Where the capacity is relatively small (20 micromicrofarads) the lumped, interelectrode capacity of the tube 39 together with the stray capacities of the conductors serves adequately in lieu of the lumped capacity.

In the anode circuit of the tube 39, a filter is connected. A low-pass filter of any general type will prove satisfactory in the practice of the broader aspects of my invention. However, I prefer a filter made up of a resistor 51 between the anode 53 and the anode supply and capacitor 55 connected between the anode and the cathode 41. This filter is designed to suppress higher frequencies and thus to reduce the amplitudes of the pulses arising from the dark current discharges relative to the amplitudes of the pulses from signal discharges. Preferably the magnitudes of the resistor 51 and the capacitor 55 should be so selected that the filter has an upper cut-off frequency equal to the reciprocal of the product of $2\pi$ by the decay interval of the fluorescent body 19. A satisfactory filter of this type may be provided by selecting the resistor and the capacitor of such magnitudes that the product of the resistance and the capacity is equal to the time constant of the network 43—45.

The anode 53 of the vacuum tube 39 is coupled to the grid 57 of a thyratron 59 such as a 6D4 or a 884 through a coupling capacitor 61. From a voltage divider 63 the thyratron is biased to non-conductivity for potentials derived from the tube 39 which are below the level of the anticipated signals produced by quanta from elementary particles. When the output of the vacuum tube exceeds this level, the bias impressed in the control circuit of the thyratron 59 is counteracted, the thyratron becomes conductive and a current pulse is transmitted through its anode circuit. The coil of a counter mechanism 65 is connected in series with the anode 67 and the anode power supply. When the thyratron is rendered conductive, the counter mechanism operates advancing the counter indicator by one unit. The counter 65 is symbolic of indicators or control mechanisms which may be used in the practice of my invention. Between the counter 65 and the cathode 69 of the thyratron 59 a capacity 71 is connected. This capacity is charged from the thyratron anode supply with its upper plate positive and its lower plate negative. When the thyratron 59 becomes conductive, the capacity is discharged through the thyratron and the counter and by reason of the inductive effect of the counter circuit, is recharged to the opposite polarity. The reverse potential impressed across the thyratron causes it to cease conducting whereupon the capacitor 71 is recharged through the resistor 72 and the circuit reset for a new count.

In Fig. 3, I have presented a series of graphs from which the character of the time constant network 43—45 and the filter 51—55 may be determined. These graphs are plotted from purely theoretical considerations, but the premises on which the graphs are based approximate actualities sufficiently closely to adequately serve the determination of the network and filter.

For the purpose of plotting the graph, I designate the resistance 45 of the time constant network as $R_1$ and its capacity 43 as $C_1$; the resistance 51 of the filter I designate as $R_2$ and its capacity 55 as $C_2$. I also assume that the phosphor decay is exponential; that is, that the intensity of the radiation emitted by the phosphor at any time $t$ following incidence of an elementary particle is given by $$I = I_0 e^{\frac{-t}{\tau}}$$

where $I$ is the initial intensity and $\tau$ is the decay constant. The decay of many phosphors is not rigorously exponential as expressed in the above equation. However, the exponential function sufficiently closely approximates the actual decay function to render the assumption valid. Further, I establish two coordinate quantities derived from the time constant of the network, the parameters of the filter and the decay constant:

$$a = \frac{R_1 C_1}{\tau} \text{ and } b = \frac{R_2 C_2}{\tau}$$

In terms of these, the curves are plotted in Fig. 3 which present the relationship between the signal-to-noise ratio and the resolution. In Fig. 3 $a$ is plotted horizontally and $b$, vertically.

The light line curves 73 of Fig. 3 constitute a family of curves which show how the signal-to-noise ratio varies for different relationships between $a$ and $b$. The parameter of these curves is the ratio of the input to thyratron 59 for an assumed discharge of the wave form of the signal discharge (many peaks 7 or a loop 11) to the input for a dark current discharge (isolated peaks 5 or 9). This ratio is in effect the signal-to-noise ratio. To facilitate the calculations, I have assumed that the charge in the signal discharge is equal to the charge in the dark current discharge; an assumption which does not impair the logic of the results, although actually the charge in the one dark current discharge is only a small fraction of the charge in the many signal discharges. Because of the assumption as to the charge, the single peak 9 which would represent the assumed dark current discharge would be many times the height of the loop 11 which would represent the signal discharge if the assumed situation were presented in Fig. 1b, and the loops 13 would be higher than the loop 15 if it were presented in Fig. 1c. The parameter is, therefore, a fraction which approaches 1 as the signal-to-noise ratio improves. The signal-to-noise ratios for the various curves 73 are indicated near the various curves. Thus, the lowest curve 73 of the family corresponds to a ratio of .50; the next curve to .6 and the others for correspondingly higher ratios. Other curves may be inserted between those plotted for other values of the ratio.

The curves 73 show that the signal-to-noise ratio may be increased by increasing either $a$ or $b$ or both. The undesired condition which results when these parameters are excessively increased is illustrated in the other family of curves 75, those of medium thickness. The parameter of these curves is the time interval in units of $\tau$ during which the dark current discharges described above fall to approximately five per cent of their maximum values. As is indicated near the curves 75, the lower curve, corresponds to a time interval of three times $\tau$, the middle curve to a time interval of six times $\tau$, and the upper curve to a time interval of nine times $\tau$. The curves 75 thus measure the ability of the system to resolve the dark current discharges. If the effect of a preceding discharge is still substantial when the effect of a succeeding one is added to it in the network 43—45, the resolution is low and the dark current discharges may be taken for signal current pulses. If the effect of a dark current discharge is low as, for example, five per cent of its original value when the succeeding discharge is impressed, the discharges will be manifested as isolated disturbances and will not materially affect the signal readings.

The medium curves 75 show that the resolution improves as the values of $a$ and $b$ decrease; that is the resolution improves under conditions under which the signal-to-noise ratio is exacerbated. For example, if $a$ equals approximately 1.1 and $b$ equals 2, the signal-to-noise ratio is approximately .84 but the time required for the effect of a dark current discharge to fall to five per cent of its initial magnitude is nine times $\tau$. On the other hand, if $a$ and $b$ are both equal to 1, the time required the dark current discharge to fall to five per cent is between three and five times $\tau$. For the latter values of $a$ and $b$, the ratio of the amplitude of the signal current loop to the dark current peak is approximately .75. This ratio corresponds to a substantial discriminating effect between signal and dark current discharges. The additional gain to be achieved by increasing $a$ and $b$ is relatively small. On the other hand, the deterioration in resolution which results from this increase is marked. Accordingly, values of 1 for $a$ and $b$ yield reasonably satisfactory results. While such values are selected in accordance with the preferred practice of my invention, my invention in its broader aspects is not to be limited to these values.

In particular, $a$ and $b$ may be selected for high signal-to-noise ratio and poor resolutions in situations in which numerous signal discharges are produced by the radiation from the body 19 for each elementary particle which infringes thereon. Under such circumstances, the charge collected from several dark current discharges 5 will be small compared to the charge collected from one signal discharge 7. Thus depending on the character of the elementary particles to be detected, the character of the body 9 and its temperature of operation, $a$ and $b$ may have a wide range of values from less than 1 to several times the average interval between dark current discharges.

Although I have shown and described a certain specific embodiment of my invention, I am fully aware that many modifications thereof are possible. My invention, therefore, is not to be restricted except insofar as is necessitated by the prior art and by the spirit and scope of the appended claims.

I claim as my invention:

1. Apparatus for detecting elementary particles with a fluorescent body to be disposed to be activated by said particles and when so activated to emit radiation during a decay interval following said activation; comprising in combination a radiation-responsive device to respond to the radiation emitted by said body when activated by producing an electrical potential, an amplifier having an input circuit having a time constant which in magnitude is between a small integral portion of and a small multiple of said decay interval and an output circuit having an upper cut-off frequency which in magnitude is between a small integral portion of and a small multiple of the reciprocal of said decay interval multiplied by $2\pi$, connections for impressing said potential in said input circuit and a discriminator for distinguishing outputs of said amplifier respectively under and over, a predetermined level.

2. In combination, a fluorescent body which when activated by elementary particles such as electrons emits radiation for a predetermined decay interval following such activation, a radiation responsive device, means for causing said radiation responsive device to respond to the radiation emitted by said body to emit electrical charges, said device also emitting stray electrical charges at random intervals in absence of radiation, a circuit for collecting said charges, means for causing the collected charge to leak away at a rate such that a small fraction, between a small integral portion and a small multiple of $\frac{1}{3}$, of the charge collected at the beginning of a time interval which in duration is between a small integral portion of and a small multiple of said decay interval leaks off during said time interval, and a discriminator for distinguishing between stray charge collected and the collected charge resulting from radiation impinging on said body.

3. In combination a fluorescent body which when activated by elementary particles such as electrons emits radiation for a predetermined decay interval following such activation, a radiation-responsive device, means for causing said device to respond to the radiation emitted by said body to emit electrical charges, said device also emitting stray electrical charges at random intervals substantially longer than said decay interval in absence of radiation, a charge collecting circuit, means for causing the charge collected on said charge collecting circuit to leak away at a rate such that a small fraction, between a small integral portion of and a small multiple of ⅓, of the charge collected at the beginning of a time interval having a duration which in duration is between a small integral portion of and a small multiple of said decay interval leaks off during said time interval, a discriminator, means for causing said discriminator to distinguish between stray charge collected and the collected charge resulting from radiation impinging on said body.

4. In combination a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals substantially longer than said decay interval in absence of radiation, an amplifier having an input circuit having a time constant which in magnitude is between a small integral portion of and a small multiple of said decay interval and an output circuit having a frequency pass band which substantially cuts off for frequencies exceeding the reciprocal of $2\pi$ multiplied by said decay interval, connections for impressing said electrical charges in said input circuit and a discriminator for distinguishing between outputs of said output circuit above and below a predetermined level, said level being set so that outputs resulting from stray electrical charges are on one side of it and outputs resulting from radiation emitted by said body are on the other side of it.

5. In combination a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals substantially longer than said decay interval in absence of radiation, an amplifier having an input circuit having a time constant which in magnitude is between a small integral portion of and a small multiple of said decay interval and an output circuit, connections for impressing said electrical charges in said input circuit and a discriminator for distinguishing between outputs of said output circuit above and below a predetermined level, said level being set so that outputs resulting from stray electrical charges are on one side of it and outputs resulting from radiation emitted by said body are on the other side of it.

6. In combination a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals in absence of radiation, a circuit for collecting means for causing the charge collected in said charges, said circuit to leak away at a rate such that a small fraction, between a small integral portion and a small multiple of ⅓, of the charge collected at the beginning of a predetermined time interval leaks off during said time interval the duration of said time interval being so selected with reference to the average duration of said random intervals and the duration of said decay interval that the stray charge collected is substantially dissipated during an average random interval but the charge resulting from radiation emitted by said body, which is collected during such random interval, has a substantial magnitude at the end of said random interval, a discriminator, and means for causing said discriminator to distinguish between stray charge collected and the charge collected as a result of radiation impinging on said body.

7. In combination a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals in absence of radiation, an amplifier having an input circuit having a time constant lying between said decay interval and the average duration of said random interval and an output circuit having a frequency pass band which substantially cuts off for frequencies exceeding the order of $2\pi$ multiplied by a quantity lying between said decay interval and the average duration of said random interval, connections for impressing said electrical charges in said input circuit and a discriminator for distinguishing between outputs of said output circuit above and below a predetermined level set so that outputs resulting from stray electrical charges are on one side thereof and outputs resulting from radiation emitted by said body are on the other side thereof.

8. In combination a photomultiplier in which dark current discharges occur at random intervals, an amplifier having an input circuit having a time constant substantially smaller than the average duration of said random intervals and an output circuit having a frequency pass band which substantially cuts off for frequencies exceeding the reciprocal of $2\pi$ multiplied by a quantity substantially smaller than said average duration, connections between said photomultiplier and said input circuit, and a discriminator for distinguishing between outputs of said output circuit above and below a predetermined level responsive to the output of said output circuit.

9. In combination a photomultiplier in which dark current discharges occur at random intervals, an amplifier having an input circuit having a time constant substantially smaller than the average duration of said random intervals and, an output circuit having a frequency pass band which substantially cuts off for frequencies exceeding the reciprocal of $2\pi$ multiplied by a quantity substantially smaller than said average duration, a thyratron responsive to the output of said amplifier and connections biasing said thyratron to non-conductivity for a predetermined output level of said amplifier and permitting said thyratron to become conductive for output levels of said amplifier differing from said predetermined output level algebraically in a predetermined sense.

10. In combination a pick-up device in which stray currents flow at random intervals, an amplifier having an input circuit having a time constant substantially smaller then the average duration of said random intervals and an output circuit having a frequency pass band which substantially cuts off for frequencies exceeding the reciprocal of $2\pi$ multiplied by a quantity substantially smaller than said average duration, connections between said pick-up device and said input circuit, and a discriminator for distinguishing between outputs of said output circuit above and below a predetermined level responsive to the output of said output circuit.

11. In combination, a fluorescent body which when activated by elementary particles such as electrons emits radiation for a predetermined decay interval following such activation, a radiation responsive device responsive to the radiation emitted by said body to emit electrical charges, said device also emitting stray electrical charges at random intervals in the absence of radiation, a circuit for collecting said charges, means for causing the collected charge to leak away at a rate such that a small fraction, between a small integral portion and a small multiple of 1/3, of the charge collected at the beginning of a time interval, having a duration between a small integral portion and a small multiple of said decay interval, leaks off during said time interval, a discriminator, and means for causing said discriminator to distinguish between the wave forms of the potential of stray charge collected and the charge collected as a result of radiation impinging on said body.

12. Apparatus for detecting elementary particles, comprising in combination a fluorescent body to be activated by said particles, said body responding to said particles during a predetermined decay interval, a radiation-responsive device, means for causing said device to respond to the radiation emitted from said body when it is activated, a mechanism responsive to said radiation-responsive device, and means including a time constant network for causing said mechanism to integrate only those responses of said radiation-responsive device which occur over a time interval which in duration is between a small integral portion of and a small multiple of said decay interval.

13. In combination, a fluorescent body which when activated by elementary particles such as electrons emits radiation for a predetermined decay interval following such activation, a radiation-responsive device, means for causing said radiation-responsive device to respond to the radiation emitted by said body to emit electrical charges, said device also emitting stray electrical charges at random intervals in absence of radiation, a circuit for collecting said charges, means including a time constant network for causing the collected charge to leak away at a rate such that a small fraction, between a small integral portion and a small multiple of 1/3, of the charge collected at the beginning of a time interval having a duration between a small integral portion and a small multiple of said decay interval leaks off during said time interval, and a discriminator for distinguishing between stray charge collected and the collected charge resulting from radiation impinging on said body.

14. In combination, a fluorescent body which when activated by elementary particles such as electrons emits radiation for a predetermined decay interval following such activation, radiation-responsive device, means for causing said device to respond to the radiation emitted by said body to emit electrical charges, said device also emitting stray electrical charges at random intervals substantially longer than said decay interval in absence of radiation, a charge collecting circuit, means including a time constant network for causing the charge collected on said charge collecting circuit to leak away at a rate such that a small fraction, between a small integral portion and a small multiple of 1/3, of the charge collected at the beginning of a time interval having a duration between a small integral portion and a small multiple of said decay interval leaks off during said time interval, a discriminator, means for causing said discriminator to distinguish between stray charge collected and the collected charge resulting from radiation impinging on said body.

15. In combination, a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals in absence of radiation, a circuit for collecting said charges, means including a time constant network for causing the charge collected in said circuit to leak away at a rate such that a small fraction, between a small integral portion and a small multiple of 1/3, of the charge collected at the beginning of a predetermined time interval leaks off during said time interval the duration of said time interval being so selected with reference to the average duration of said random intervals and the duration of said decay interval that the stray charge collected is substantially dissipated during an average random interval but the charge resulting from radiation emitted by said body, which is collected during such random interval, has a substantial magnitude at the end of said random interval, a discriminator, and means for causing said discriminator to distinguish between stray charge collected and the charge collected as a result of radiation impinging on said body.

16. In combination, a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals in the absence of radiation, a circuit for collecting said charges, means for causing the collected charge to leak away at a rate such that a small fraction, between a small integral portion and a small multiple of 1/3, of the charge collected at the beginning of a time interval, having a duration between a small integral portion and a small multiple of said decay interval leaks off during said time interval, a discriminator, and means including a time constant network for causing said discriminator to distinguish between the wave forms of the potential of stray charge collected and the charge collected as a result of radiation impinging on said body.

17. In combination, a fluorescent body which when activated by elementary particles such as electrons emits radiation for a predetermined decay interval following such activation, a radiation-responsive device responsive to the radiation emitted by said body to emit electrical charges, said device also emitting stray electrical charges at random intervals substantially longer than said decay interval in absence of radiation, an amplifier having an input circuit having a time constant which in magnitude is between a small integral portion of and a small multiple of said decay interval and an output circuit having a frequency pass band which substantially cuts off for frequencies exceeding the reciprocal of $2\pi$ multiplied by said decay interval, connections for impressing said electrical charges in said input circuit and a discriminator for distinguishing between outputs of said output circuit above and below a predetermined level, said discriminator being related to said output circuit and said radiation-responsive device to respond at a level above the outputs resulting from stray electrical charges but below the outputs resulting from radiation emitted by said body.

18. The method of detecting elementary particles which comprises selecting a fluorescent body which when activated by said particles emits radiant energy during a predetermined decay interval following said activation, converting said radiant energy into electrical charges, collecting said charges during time intervals having a duration between a small integral portion and a small multiple of said decay intervals and discriminating between said collected charges and stray charges collected during time intervals of said duration.

19. Apparatus for detecting elementary particles, comprising in combination a fluorescent body to be activated by said particles, said body responding to said particles during a predetermined decay interval, a radiation-responsive device, means for causing said device to respond to the radiation emitted from said body when it is activated, a mechanism responsive to said radiation responsive device, and means for causing said mechanism to integrate only those responses of said radiation responsive device which occur over a time interval which in duration is between a small integral portion of and a small multiple of said decay interval.

20. The method of detecting elementary particles with apparatus, including a fluorescent body disposed to be activated by said elementary particles and when so activated to emit radiant energy during a predetermined decay interval following said activation, which comprises converting said radiant energy into electrical charges, collecting said charges during time intervals which in duration are between a small integral portion of and a small multiple of said decay intervals and discriminating between said collected charges and stray charges collected during time intervals of said duration.

21. The method of detecting elementary particles with apparatus, including a fluorescent body disposed to be activated by said particles and when so activated to emit radiant energy during a predetermined decay interval and radiant energy responsive device, which emits electrical charges when radiant energy impinges thereon, responsive to the radiant energy emitted by said fluorescent body, said device also emitting electrical charges at random intervals when not under the influence of radiant energy; which comprises collecting the electrical charges emitted by said radiant energy responsive device during successive time intervals having an effective duration which is between a small integral portion of and a small multiple of said decay intervals and discriminating between the total charge collected during said time intervals during which radiant energy is emitted by said radiant energy responsive device and the total stray charge collected during said time intervals.

22. The method of detecting elementary particles with apparatus, including a fluorescent body disposed to be activated by said particles and when so activated to emit radiant energy during a predetermined decay interval and a radiant energy responsive device, which emits electrical charges when radiant energy impinges thereon, responsive to the radiant energy emitted by said fluorescent body, said device also emitting electrical charge at random intervals in absence of radiant energy; which comprises collecting the electrical charges emitted by said radiant energy responsive device, causing the collected electrical charges to leak off at a rate such that a small portion, between a small integral portion of and a small multiple of $\frac{1}{3}$, of the charge collected at the beginning of a time interval which in duration is between a small integral portion of and a small multiple of said decay interval remains at the end of said time interval; and discriminating between the residual of the stray charge and the charge collected as a result of activation of said body.

23. In combination a photomultiplier in which dark current discharges occur at random intervals, an amplifier having an input circuit having a time constant which in magnitude is between a small integral portion of and a small multiple of the average duration of said random intervals and an output circuit having a frequency pass band which substantially cuts off for frequencies exceeding the reciprocal of $2\pi$ multiplied by a quantity having a magnitude of between a small integral portion and a small multiple of said average duration, connections between said photomultiplier and said input circuit, and a discriminator, for distinguishing between outputs of said output circuit above and below a predetermined level, responsive to the output of said output circuit.

24. In combination a photomultiplier in which dark current discharges occur at random intervals, an amplifier having an input circuit having a time constant which in magnitude is between a small integral portion of and a small multiple of the average duration of said random intervals and an output circuit having a frequency pass band which substantially cuts off for frequencies exceeding the reciprocal of $2\pi$ multiplied by a quantity having a magnitude between a small integral portion and a small multiple of said average duration, a thyratron responsive to the output of said amplifier and connections biasing said thyratron to nonconductivity for a predetermined output level of said amplifier and permitting said thyratron to become conductive for output levels of said amplifier differing from said predetermined output level algebraically in a predetermined sense.

25. In combination, a pick-up device in which stray currents flow at random intervals, an amplifier having an input circuit having a time constant which in magnitude is between a small integral portion of and a small multiple of the average duration of said random intervals and an output circuit having a frequency pass band which substantially cuts off for frequencies exceeding the reciprocal of $2\pi$ multiplied by a quantity having a magnitude between a small integral portion and a small multiple of said average duration, connections between said pickup device and said output circuit, and a discriminator, for distinguishing between outputs of said circuit above and below a predetermined level, responsive to the output of said output circuit.

26. The method of detecting elementary particles with apparatus, including a fluorescent body disposed to be activated by said elementary particles and when so activated to emit radiant energy during a predetermined decay interval following said activation, which comprises converting said radiant energy into electrical charges, collecting said charges during time intervals having a duration between a small integral portion and a small multiple of said decay intervals and discriminating between the wave form of the potential produced by said collected charges and the wave form of the potential produced by stray charges.

JOHN W. COLTMAN.

REFERENCES CITED

The following references are of record in the file of this patent:

UNITED STATES PATENTS

| Number | Name | Date |
|---|---|---|
| 1,963,185 | Wilson | June 19, 1934 |
| 2,189,623 | Bourland | Feb. 6, 1940 |
| 2,252,530 | Sweeney et al. | Aug. 12, 1941 |
| 2,352,377 | Francis | June 27, 1944 |
| 2,401,288 | Morgan et al. | May 28, 1946 |
| 2,408,230 | Shoupp | Sept. 24, 1946 |
| 2,423,885 | Hammond | July 15, 1947 |

OTHER REFERENCES

U. S. Atomic Energy Commission Document MDDC 275, by S. S. Allen, issued Mar. 1, 1944—pp. 1–11.

The Photomultiplier X-Ray Detector, by Marshall, Coltman and Hunter, Review of Scientific Instruments—vol. 18, 1947, pp. 504–513.

X-Ray Inspection with Phosphors and Photoelectric Tubes, by R. H. Smith—General Electric Review—Mar. 1945, pp. 13–17.